United States Patent [19]

Anderson et al.

[11] Patent Number: 4,930,228

[45] Date of Patent: Jun. 5, 1990

[54] STEM LOAD DETERMINING SYSTEM

[75] Inventors: Paul G. Anderson; John A. McMennamy, both of Cobb County, Ga.

[73] Assignee: Movats Incorporated, Marietta, Ga.

[21] Appl. No.: 258,659

[22] Filed: Oct. 17, 1988

Related U.S. Application Data

[63] Continuation of Ser. No. 41,006, Apr. 21, 1987, which is a continuation of Ser. No. 36,024, Apr. 8, 1987.

[51] Int. Cl.$^5$ ............................................. G01B 5/00
[52] U.S. Cl. ...................................................... 33/788
[58] Field of Search ........... 73/862.49, 862.51, 862.52, 73/862.54, 862.64, 862.65, 862.66, 862.67, 862.32, 781, 795, 826, 831, 818, 855, 761, 788, 789, 790, 791, 792, 795, 862.33, 862.35, 862.31; 33/143 G, 147 L, 147 N, 147 D, 148 D, 788

[56] References Cited

U.S. PATENT DOCUMENTS

| | | | |
|---|---|---|---|
| 753,015 | 1/1884 | Tretch | 73/782 |
| 2,099,662 | 11/1937 | Slonneger | 33/147 D |
| 2,198,041 | 4/1940 | Peters | 33/147 D |
| 3,295,365 | 1/1967 | Larrigan et al. | 33/147 D |
| 3,820,388 | 6/1974 | Fletcher et al. | 73/862.62 |
| 4,251,918 | 2/1981 | Duggun | 33/148 D |
| 4,527,335 | 7/1985 | Meline | 33/147 D |
| 4,528,542 | 7/1985 | Meline | 338/6 |
| 4,543,837 | 10/1985 | Stesn et al. | 338/6 |
| 4,570,903 | 2/1986 | Crass | 73/862.31 |
| 4,619,147 | 10/1986 | Yoshimota et al. | 73/862.65 |
| 4,657,097 | 4/1987 | Griffen | 73/862.65 |
| 4,674,342 | 6/1987 | Ushijima et al. | 73/862.65 |

OTHER PUBLICATIONS

SATEC Extensometers-Bulletin Ex-5016 SATEC Systems Inc., Grove City, Pa.
M-Line Accessories Instruction Bulletin B-127-9, "Strain Gage Installations with M-Bond 200 Adhesive", Measurement Group Inc., 1979.
The Center for Professional Advancement, "Strain Gage Measurements" Booklet.

*Primary Examiner*—Robert R. Raevis
*Attorney, Agent, or Firm*—Louis T. Isaf

[57] ABSTRACT

A stem load determining system comprises a method and apparatus for determining the load developed on a threaded stem, including a valve stem driven by a valve operator. An integral component of the apparatus is a stem strain transducer uniquely designed to girp a threaded stem to define a guage length on the threaded stem and to detect and measure deformation of the stem at the guage length when subjected to a compressive or tensile load.

6 Claims, 3 Drawing Sheets

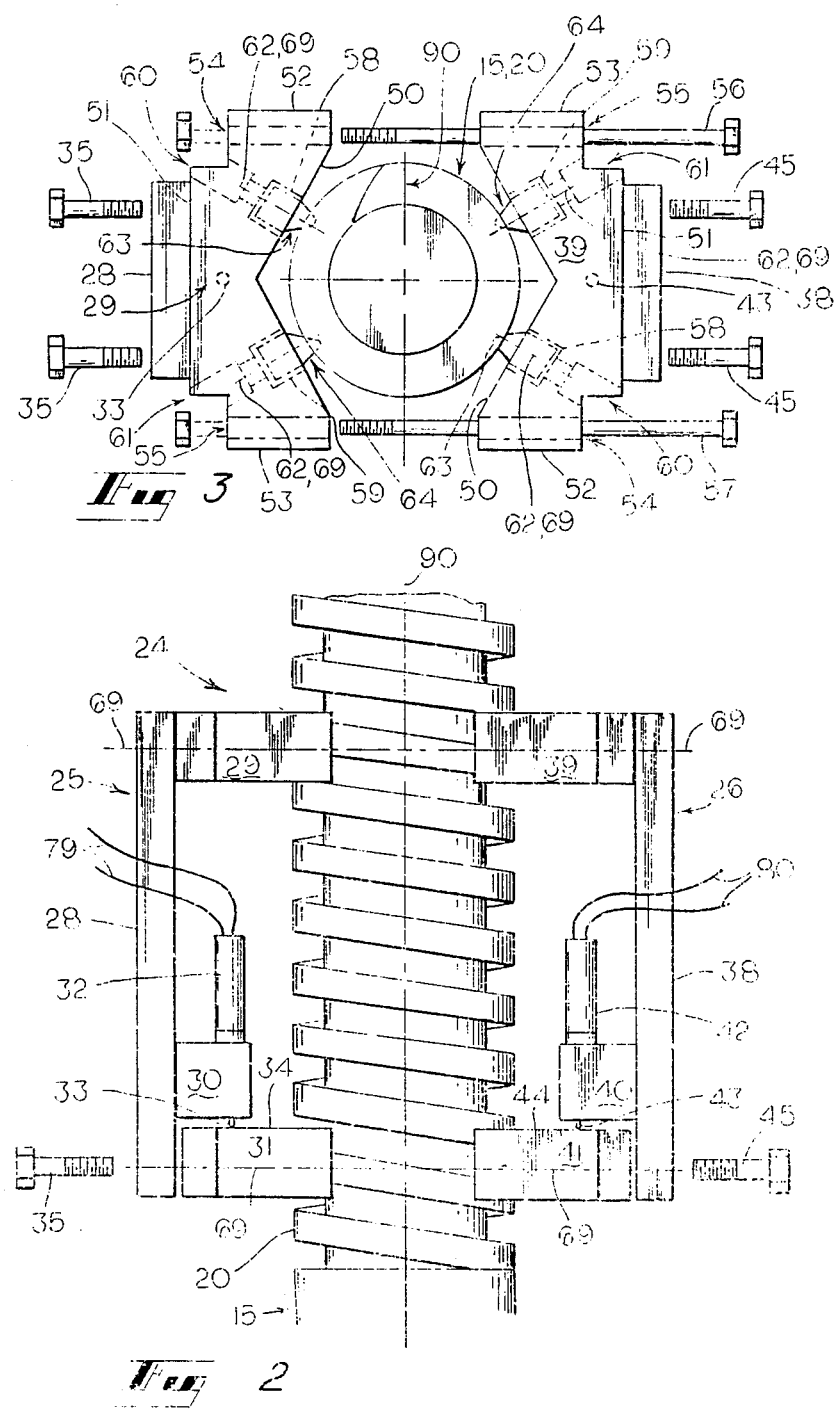

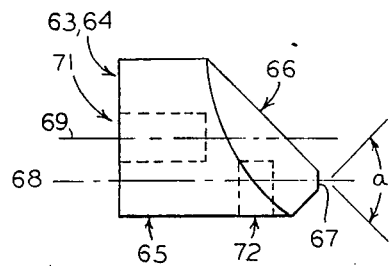 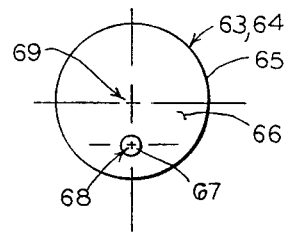
*Fig 4A*   *Fig 4B*
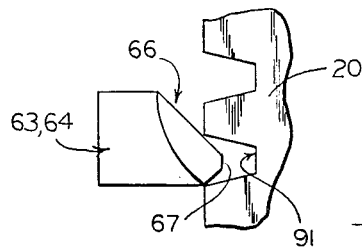
*Fig 6*
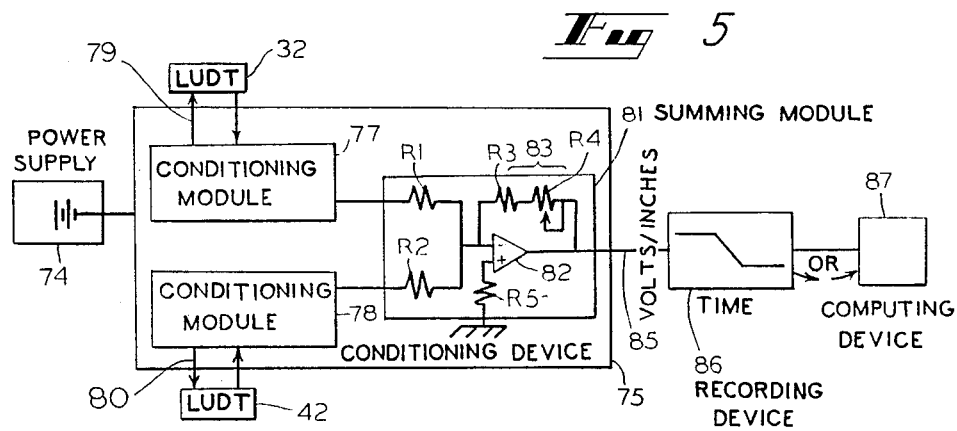
*Fig 5*

STEM LOAD DETERMINING SYSTEM

This application is a continuation of application Ser. No. 041,006, filed Apr. 21, 1987, which is a continuation of application Ser. No. 036,024, filed Apr. 8, 1987.

FIELD OF THE INVENTION

The present invention relates generally to the field of strain and stress measuring devices and more specifically to devices for the measuring of strain and stress on thread bearing stems within flow-controlling valve systems.

BACKGROUND OF THE INVENTION

The ability to measure thrust in a valve operator has become increasingly important since the advent of the Charbonneau et al invention disclosed in U.S. Pat. No. 4,542,649. More importantly, the need to measure operator thrust while the operator is attached to the valve has been identified. Charbonneau and other prior art have utilized load cells mounted to the upper bearing housing to measure stem load as the valve stem rises from the close-to-open position to strike the mounted load cell. The load cell technique of measuring stem load is not always functional, since many valve operator designs do not have an upper bearing housing to which a load cell can be mounted.

SUMMARY OF THE INVENTION

Briefly described, the present invention comprises a method, and associated apparatus, for determining the load developed on a valve stem driven by a valve operator. The method of the present invention utilizes known principles and specifications related to stress and strain of metals, and specifically threaded shafts; and applies these principles and specifications in combination with the unique apparatus of the present invention. The method and apparatus of the present invention detect and measure deformation of the threaded portion of the valve stem when the stem is loaded. The measured deformation is recorded and inputed to a calculating device for determination of the load imposed on the stem. In the preferred embodiment, compressive deformation and compressive loads are measured and determined; however tensile is contemplated.

The apparatus of the present invention comprises a unique thread gripping assembly which tightly and rigidly grasps the threaded portion of the valve stem such that the gripping assembly moves with the stem. The gripping assembly includes spaced apart reference points which move relative to one another, yet are rigidly attached to the threads defining a test segment (also referred to as guage length) of the threaded portion. As the metal body of the valve stem deforms (i.e. compresses or stretches) under load, the reference points move relative to oneanother. Thus, the deformation of the test segment is mirrored by movement of the reference points. The relative movement of the reference points is detected, measured and recorded by the apparatus of the invention. The measured deformation is, in preferred embodiments, input with other materials specifications to a calculating device in which the load is calculated.

In the preferred embodiment of the present invention, deformation of the test segment is measured in two locations to compensate for bending of the stem under load. Furthermore, the apparatus of the invention comprises uniquely shaped, tapered-conical gripping elements which, in combination with clamping members, are instrumental in accomplishing the necessary grip on the threads of the valve stem, whereby the reference points move accurately with deformation of the stem.

It is understood that the method and apparatus of the present invention and the stem load calculated hereby have broad, cross-industry applications; and, without limiting such applications, the invention finds specific application in the valve diagnostic industry as an improvement to the Charbonneau et al invention of U.S. Pat. No. 4,542,649, the disclosure of U.S. Pat. No. 4,542,649 being hereby incorporated herein by reference.

It is, therefore, an object of the present invention to provide a method for determining load on an operator driven valve stem as the valve stem moves from the open to close position.

Another object of the present invention is to provide a method and apparatus for determining valve stem load by mounting measuring devices on the threaded portion of the valve stem.

Yet another object of the present invention is to provide a method and apparatus for measuring deformation of a valve stem subjected to a load.

Still another object of the present invention is to provide apparatus for rigidly gripping screw threads and detecting deformation of the thread shaft upon loading.

Other objects features and advantages of the present invention will become apparent upon reading and understanding this specification, taken in conjunction with the accompanying drawings.

BRIEF DESCRIPTION OF THE DRAWINGS

FIG. 2 is an isolated side view of the stem strain transducer of the stem load determining system of FIG. 1.

FIG. 3 is a top view of FIG. 2.

FIG. 4a is a side view of a stud member in accordance with the present invention.

FIG. 4b is an end view of the stud member of FIG. 4a.

FIG. 5 is a schematic representation of the electronic devices of the stem load determining system of FIG. 1.

FIG. 6 is an isolated view of a thread portion showing engagement of a stud member in accordance with the present invention.

DETAILED DESCRIPTION OF THE PREFERRED EMBODIMENT

Figure 1:
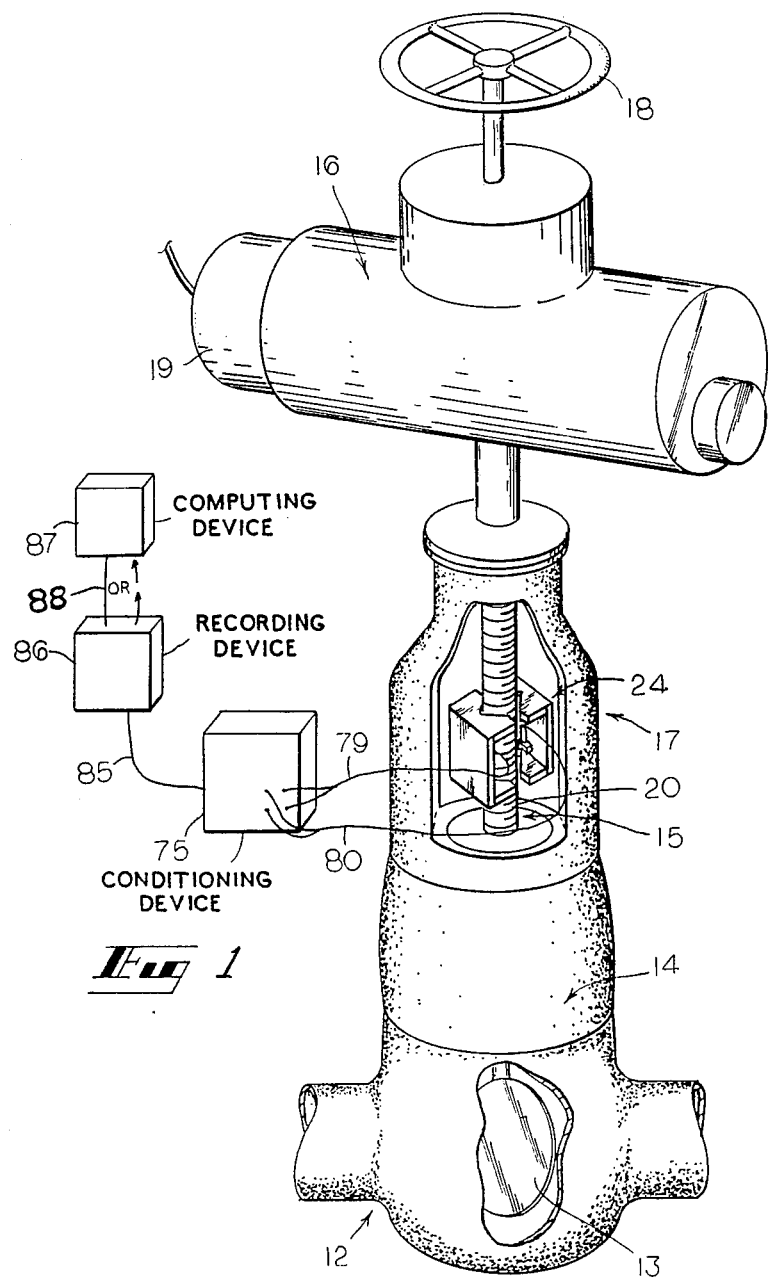
FIG. 1 is a pictorial view of stem load determining system in accordance with the present invention, as used in conjunction with a valve and valve operator.

Referring now in greater detail to the drawings in which like numerals represent like components throughout the several views, FIG. 1 shows (in partial schematic form) the apparatus of the present invention in its preferred operating environment. A process pipe 12 is provided with a valve 3, shown as a gate valve. The valve 13 is moved up and down, perpendicular to the fluid flow in the pipe 12, by a valve stem 15. The valve stem 15 is driven up and down by a gearing device 16, known as a valve operator 16. The operator 16 is supported above the valve 13 by a yoke 17. In the preferred embodiments, the operator is manually operated by a handwheel 18 or motor operated by a motor 19.

As seen in FIG. 1, a stem strain transducer 24 is mounted on the threaded portion 20 of the valve stem 15. Detailed in FIGS. 2 and 3, the stem strain transducer 24 comprises a left clamp half 25 and a right clamp half 26. The left clamp half 25 includes a support plate 28 to which is rigidly attached an upper gripping plate 29 and a mounting bracket 30. A lower gripping plate 31 is releasably attached, as by bolts 35, to the support plate 28. A linear variable differential transducer ("LVDT") 32 is attached to the bracket 30 and the stylus (core extension) 33 of the LVDT contacts the top surface 34 of the lower gripping plate 31. The right clamp half 26 includes a support plate 38 to which is rigidly attached an upper gripping plate 39 and a mounting bracket 40. A lower gripping plate 41 is releasably attached, as by bolts 45, to the support plate 38. An LVDT 42 is attached to the bracket 40 and the stylus (core extension) 43 of the LVDT contacts the top surface 44 of the lower gripping plate 41. The LVDTs are of a type typical in the industry having a core moving through a stationary base to effect a voltage output signal.

FIG. 3 is a top view of the assembly of FIG. 2, and only the two upper plates 29, 39 are in view. However, the lower plates 31, 41 are similar in construction and assembly. Each of the four gripping plates 29, 31, 39, 41 is formed with a wedge-shaped concavity 50 defining its front edge 50, and a back edge 51 by which the gripping plate is attached to the respective support plate 28, 38. The ends 52, 53 are formed with bolt channnels 54, 55. Two stud accepting bores 58, 59 are drilled into the front edge of each gripping plate 29, 31, 39, 41, each bore being oriented with its centerline 62 perpendicular to one side of the wedge of the front edge. Access is had to each bore 58, 59 from the back edge 51 of the plate 29, 31, 39, 41 by a screw channel 60, 61. A stud member 63, 64 is held in each bore 58, 59 by a screw through the screw channel 60, 61. The stud member 63, 64 is adjustable for rotational and axial movement within the bore 58, 59. Each stud member 63, 64 is uniquely formed with a cylindrical body 65 and a tapered-conical head 66, as seen in greater detail in FIGS. 4a and 4b. In the preferred embodiment, the cone of the head 66 defines an angle "a" in profile of about 90°. The centerline 68 of the conical head 66 is offset from the centerline 69 of the body 65. In the preferred embodiment, the head centerline 68 is offset a distance equal to about one-half of the radius of the stud body 65. FIG. 4a also indicates the threaded channel 71 by which a screw holds the stud member 63, 64 in the bore 58, 59. A key hole 72 is drilled in the stud member 63, 64 toward the head end.

With reference now to FIGS. 1 and 5, the electronics portion of the apparatus of the present invention is seen as including a power supply 74 supplying power to a conditioning device 75. The conditioning device 74 includes a conditioning module 77, 78 for each of the LVDTs 32, 42. Each conditioning module 77, 78 provides excitation power to its respective LVDT 32, 42 and receives the LVDT signal, along wiring 79, 80. In the preferred embodiment, the modules 77, 78 provide demodulation and amplification of the LVDT signal, and convert the LVDT output into a filtered, high level DC signal. Such modules are available "off-the shelf". The conditioning device 75 further includes a summing module 81 which combines the output signals from the two conditioning modules 77, 78 into a single output from the conditioning device. The summing device includes an amplifier 82, separate input resistors R1 and R2, a feedback loop 83 (including resistors R3 and R4), and bias-current compensating resistor R5. The values of the resistors are varied by choice to provide a desired output. For example, the output from the summing module 81 in one embodiment is an average of the two signals from the conditioning modules 77, 78 (in such case, the resistor values are R1=R2=10 Kohms, R3=4.5 Kohms, R4=1 Kohms, the R3-R4 pair being adjustable to 5 Kohms, R5=2.5 Kohms); but, in another embodiment, the summing module output is the sum of the two conditioning module signals (R1=R2=10 K; R3=9.5 K, R4=1 K adjustable, R5=4.3 K). The respective outputs are, typically, in the form of DC voltages.

The output signal from the conditioning device 75 is delivered along cable 85 to a recording device 86, such as an osciloscope, at which device the signal values are recorded and where such signal values can be visually observed. The voltage signal from the conditioning device 75 is related to a corresponding distance measurement value at the recording device 86. From the recording device 86, the distance values are transferred to a computing device 87, either electronically as by cable 88 to a computer, or manually as by keypad to a calculator.

OPERATION

The above described apparatus is connected to the valve stem 15 through the mounted stem strain transducer 24. In practice, it is best to draw the valve 13 partially open and out of its seat, such that the valve stem is in a relaxed state (that is, experiencing no compressive stress). The stem strain transducer 24 is then mounted to the threaded portion 20 of the valve stem 15 near the top of the yoke 17. In this manner, as the valve 13 is again closed, the strain transducer will not bind against the top of the valve housing 14. Prior to mounting of the stem strain transducer 54 on the valve stem 15, the clamp halves 25, 26 are assembled per the above description. The lower gripping plates 31, 41 are bolted against movement to the respective support plates 28, 38. Note that the top surfaces 34, 44 of the lower gripping plates 31, 41, when attached to the support plate 28, 38 are spaced apart from the LVDT mounting brackets 30, 40. Mounting of the transducer 24 is accomplished, with reference to FIG. 2, by aligning the two clamp halves 25, 26 at the threaded portion 20 of the valve stem 15, with one clamp half 25, 26 on each side of the axial plane 90 of the valve stem 15. As seen in FIG. 3, the wedge-shaped concavities 50 of the various gripping plates 29, 31, 39, 41 cradle the stem 15. The stud members 63, 64 of all of the gripping plates 29, 31, 39, 41 are drawn tightly into their respective stud accepting bores 58, 59 by a screw within the screw channel 60, 61. As the clamp halves 25, 26 are aligned on the threaded portion 20, the tapered-conical heads 66 of the various stud members 63, 64 project into the valleys 91 of the stem threads—each head 66 projects into one valley (see FIG. 6). The cone shape of the head 66 assists in a snug fit of the stud member 63 on threads of varying size. The offset nature of the tip 67 assists in compensating for the pitch and lead of the subject threads in order to maintain the paired, upper plates 29, 39 and the paired, lower gripping plates 31, 41 in parallel alignment. The tapered-conical heads 66 of the various stud members are rotated about the body centerlines 69 to assure a good fit within the thread valleys 91, and provide for approximate, parallel alignment of the paired gripping plate. In the preferred embodiment, once the two clamp halves 25, 26 are mounted in alignment on the stem 15, the body centerlines 69 of the four stud members 63, 64 in the two upper gripping plates 29, 39 all lie within a single plane, perpendicular to the axial plane 90 of the valve stem; and the body centerlines 69 of the four stud members 63, 64 in the two lower gripping plates 31, 41 all lie within a single plane, pependicular to the axial plane 90. Preferrably, the centerlines 68 of the various stud heads 66 are as close as practicable to the respective planes of the body centerline 69. Rotating of the stud members 63, 64 about the body centerline 69 is aided by inserting of a pin into the keyholes 72 and using such pin as a lever. The stud members 63, 64 are tightened within the bores 58, 59 by the screws in screw channels 60, 61 to hinder further movement. The paired gripping plates 29, 39 and 31, 41 are drawn together about the stem 15 by bolts 56, 57 through the bolt channels 54, 55.

The head centerlines 68 of the stud members 63, 64 function as reference points, marking reference points on the stem 15. The reference points define a test segment or guage length ("L") on the valve stem 15. The axial distance between corresponding reference points (head centerlines) 67 of the gripping plates 29, 31, 39, 41 ae measured. Thus, measure the distance between head centerlines 68 of stud members 63 of left half gripping plates 29, 31; the distance between head centerlines 68 of stud members 64 or left half gripping plates 29, 31; the distance between head centerlines 68 of stud members 63 of right half gripping plates 39, 41; and the distance between head centerlines 68 of stud members 64 of right half gripping plates 39, 41. The average of these four distances is taken as the guage length "L" and is entered into the memory of the computing device 87. The LVDTs 32, 42 are connected to the conditioning device 75 which is connected to the recording device 86, as disclosed above. In the preferred embodiment, each LDVT 32, 42 is mounted to its respective clamp half 25, 26 in such a manner that, when the clamp halves are mounted to the valve stem 15, the cores (style 33, 43) of the LVDT's 32, 42 are spaces apart 180° radially about the centerline of the valve stem and equidistant from the centerline of the stem. At this time, the bolts 35, 45 which hold the lower gripping plates 31, 41 to their respective support plate 28, 38 are removed such that the lower gripping plates 31, 41 are now clamped by bolts, 56, 57 to the valve stem 15 but are free to move relative to the LVDT mounting brackets 30, 40.

The valve stem 16 is now driven downward by either manual or motor operation of the valve operator 16, to close the valve 13. As the valve 13 seats in the closed position a compressive load (the "stem load") is developed with the valve stem. The stem load continues to increase until such time as the torque switches within the valve operator trip to disengage the operator (or manual operation is stopped).

The compressive load to which the stem 15 is subjected results in a compression of the deformable material of which the stem is made. As the stem 15 is compressed, the test segment (guage length) of the stem, which is defined by the distance "L", is proportionately compressed. As the test segment is compressed, the lower gripping plates 31, 41 move relative to the LDVT mounting brackets 30, 40. The reference surfaces 34, 44 move the LDVT stylus 33, 43 which creates a relative movement between LDVT core and base (as known in the industry) to generate a signal representing the change ("dL") in the length ("L") of the test section. It can be seen that if the test segment is subjected to bending, the distance between reference points of one clamp half will increase, while the distance between reference points of the other clamp half will decrease. The respective LVDT 32, 42 will detect and signal a dL indicating the relative increase or decrease. As explained above, the signal from each LVDT 32, 42 is passed from the respective conditioning modules 77, 78 to the summing device 81 where the real values are added, averaged, or otherwise conditioned, and then sent to the recording device 86 where the conditioned signal is displayed or otherwise recorded. In the preferred embodiments, a time related trace of the change (dL) in test length "L" is recorded and displayed. A sample of such trace 93 is seen in FIG. 5. The distance value recorded at the recording device 86 is next entered into the computing device as discussed above. It is understood that the recording and computing steps are combinable.

The final determination of an actual value of the stem load is based on principles of strength of materials and elastic bodies. The following formulas are known in the art and are appropriate:

Strain = dL

Stress = (strain) × (modulus of elasticity)

Force = (stress) × (stress area)

Stress Area for a thread section is based on the mean of the minimum pitch diameter (P) and the minimum minor diameter (K), thus:

Stress Area = $\pi[(P+K)/4]^2$

Therefore, the following calculation is accomplished by the computing device 87:

F = $\pi[dL\ E/L] \times [(P+K)/4]^2$

Where:
F is stem load.
dL is as determined by the conditioning device 75. If the summing device 81 generates an output which is different than the average dL, the appropriate modification must be made to the above formula.
E is the modulus of elasticity of the stem material.
L is the length of the stem, test segment as previously measured.
P is the minimum pitch diameter of the threaded portion 20 based on the threads geometry.
K is the minimum minor diameter of the threaded portion 20, based on the threads geometry.

Whereas, the stem strain transducer 24 is disclosed herein as part of a larger invented system, it is understood that the stem strain transducer is itself unique and finds application in other threaded stem environments.

Whereas, the preferred embodiment expressed herein discloses use of an LVDT to detect and measure relative movement between two reference points, it is within the scope of the present invention to use other movement detecting devices to accomplish the similar goal.

Whereas, the preferred embodiment of the present invention discloses use of the stem strain transducer 24 to define a test segment and to track reference points defining the limits of the test segment, it is within the scope of the present invention to utilize other methods to accomplish the same goal, within the more expansive apparatus and method of the present invention.

Whereas, the present invention is described in detail with specific reference to preferred embodiments thereof, it will be understood that variations and modifications can be effected within the spirit and scope of the invention as described before and as defined in the appended claims.

We claim:

1. An apparatus for monitoring the axial deformation in a stem or other symmetrical object which is subjected to a load, said apparatus comprising:

first gripping member positioned along the object;

second gripping member cooperating with said first gripping member to releasably and tightly grip the object between them;

third gripping member positioned along the object at a position axially displaces from said first gripping member;

fourth gripping member cooperating with said third gripping member to releasably and tightly grip the object between them;

wherein said first and third gripping members are capable of relative movement to one another in each of the axial, radial and angular directions in response to forces acting on the object, and wherein said second and fourth gripping members are capable of independent relative movement relative to one another in each of the axial, radial and angular directions in response to forces acting on the object;

first movement detecting means for detecting the axial component of the relative movement between said first and third gripping members and for generating an electrical signal representative of said axial component;

second movement detecting means for detecting the axial component of the relative movement between said second and fourth gripping members and for generating an electrical signal representative of said axial component of movement between said second and fourth gripping members; and means for combining said signal from said first movement detecting means and said signal from said second movement detecting means in a predetermined manner, thus providing a signal representative of the axial deformation of the object;

said first movement detecting means and said second movement detecting means each being so comprised as to not inhibit said independent relative movement of said gripping members in each of the radial and angular directions, whereby freedom of movement is available between the first and third gripping members and between the second and fourth gripping members for at least some distance in each of the axial, radial and angular directions and whereby axial deformation of the object is measurable while the object is experiencing any and all of axial, bending and torsional forces.

2. Apparatus of claim 1, wherein said first movement detecting means comprises, at least:

a first striking surface mounted to said first gripping member; and a first LVDT comprising a base element mounted to said third gripping member and a core element supported by and protruding from said base element, said core element being movable relative the LVDT base element in response to relative axial movement between said first and third gripping members to generate said electrical signal representative of said axial component of the relative movement between said first and third gripping members;

said LVDT core element contacting said first striking surface in a manner so as to move relative to said first striking surface in response to radial and angular deformation of the object and to move with said first striking surface in response to axial deformation of the object; and wherein said second movement detecting means comprises, at least:

a second striking surface mounted to said second gripping member; and a second LVDT comprising a base element mounted to said fourth gripping member and a core element supported by and protruding from said base element, said core element being movable relative to the base element of said second LVDT in response to relative axial movement between said second and fourth gripping members to generate said electrical signal representative of said axial component of the relative movement between said second and fourth gripping members;

said LVDT core element of said second LVDT contacting said second striking surface in a manner so as to move relative to said second striking surface in response to radial and angular deformation of the object and to move with said second striking surface in response to axial deformation of the object.

3. Apparatus of claim 2, wherein said core element of said first LVDT contacts said first striking surface at a location which is displaced 180 degrees about the centerline of the object from the location at which said core element of said second LVDT contacts said second striking surface, and wherein said contact locations are spaced equidistant from the centerline of the object.

4. Apparatus of claim 1, further comprising interconnect means interconnecting said first and second gripping members for drawing said first and second gripping members toward oneanother and tightly against said object; and second interconnect means interconnecting said third and fourth gripping members for drawing said first and second gripping members toward oneanother and tightly against said shaft.

5. Apparatus of claim 1, wherein said first movement detecting means comprises, at least:

a strike element mounted to said first gripping member and movable with said first gripping member;

a contact assembly supported by said third gripping member, at least a reactive portion of said contact assembly being positioned for engagement by said strike element and being movable relative to said third gripping member within an axial plane parallel to the axis of the object in response to axial movement of said strike element; and signal means responsive to the relative movement between said reactive portion and said third gripping member for generating an electrical signal representative of the axial component of said relative movement between said reactive portion and said third gripping member, wherein relative movement between said first and third gripping members effects movement of said reactive portion in response to movement of said strike element, which in turn effects generation of said electrical signal; and wherein said second movement detecting means comprises, at least:
- a strike element mounted to said second gripping member and movable with said second gripping member;
- a contact assembly supported by said fourth gripping member, at least a reactive portion of said contact assembly being positioned for engagement by said strike element and being movable relative to said fourth gripping member within an axial plane parallel to the axis of the object in response to axial movement of said strike element; and
- signal means responsive to the relative movement between said reactive portion and said fourth gripping member for generating an electrical signal representative of the axial component of said relative movement between said reactive portion and said fourth gripping member, wherein relative movement between said second and fourth gripping members effects movement of said reactive portion in response to movement of said strike element, which in turn effects generation of said electrical signal.

6. Apparatus of claim 5, wherein each said reactive portion is substantially non-responsive to angular movement of the respective said strike element about the object axis.

* * * * *